US011215736B2

United States Patent
Bowering

(10) Patent No.: US 11,215,736 B2
(45) Date of Patent: Jan. 4, 2022

(54) EUV OPTICAL ELEMENT HAVING BLISTER-RESISTANT MULTILAYER CAP

(71) Applicant: ASML NETHERLANDS B.V., Veldhoven (NL)

(72) Inventor: Norbert Bowering, Bielefeld (DE)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 15/038,430

(22) PCT Filed: Jan. 29, 2015

(86) PCT No.: PCT/EP2015/051809
§ 371 (c)(1),
(2) Date: May 20, 2016

(87) PCT Pub. No.: WO2015/117887
PCT Pub. Date: Aug. 13, 2015

(65) Prior Publication Data
US 2016/0349412 A1 Dec. 1, 2016

(30) Foreign Application Priority Data
Feb. 7, 2014 (EP) ..................................... 14154265

(51) Int. Cl.
*G02B 1/14* (2015.01)
*G02B 5/08* (2006.01)
*G21K 1/06* (2006.01)

(52) U.S. Cl.
CPC ............. *G02B 1/14* (2015.01); *G02B 5/0816* (2013.01); *G02B 5/0875* (2013.01); *G02B 5/0891* (2013.01); *G21K 1/062* (2013.01)

(58) Field of Classification Search
CPC .......... G02B 1/10; G02B 1/14; G02B 5/0816; G02B 5/0825; G02B 5/0833; G02B 5/085;
(Continued)

(56) References Cited

U.S. PATENT DOCUMENTS

2004/0002009 A1    1/2004  Yan
2005/0199830 A1*   9/2005  Bowering .............. B82Y 10/00
                                                    250/504 R
(Continued)

FOREIGN PATENT DOCUMENTS

CN    103380401 A    10/2013
CN    103443863 A    12/2013
(Continued)

OTHER PUBLICATIONS

International Search Report of PCT/EP2015/051809 dated Mar. 10, 2015.
Chinese Office Action for corresponding Chinese Application No. 2016-537513 dated Jan. 7, 2019.
(Continued)

*Primary Examiner* — Marin Pichler
*Assistant Examiner* — Ephrem Z Mebrahtu
(74) *Attorney, Agent, or Firm* — DiBerardino McGovern IP Group LLC

(57) ABSTRACT

A multilayer mirror having a cap with a multilayer structure including a top layer and a series of bilayers each having an absorber layer and a spacer layer, where the materials for the top layer, absorber layers, and spacer layers are chosen to resist blistering.

5 Claims, 2 Drawing Sheets

(58) Field of Classification Search
CPC ............... G02B 5/0875; G02B 5/0883; G02B 5/0891; G21K 1/062
See application file for complete search history.

(56) References Cited

U.S. PATENT DOCUMENTS

| | | | | |
|---|---|---|---|---|
| 2005/0239239 | A1* | 10/2005 | Takanabe | H01L 29/66757 438/166 |
| 2006/0024589 | A1* | 2/2006 | Schwarzl | B82Y 10/00 430/5 |
| 2009/0103069 | A1* | 4/2009 | Jonckheere | G03F 7/7085 355/67 |
| 2010/0071720 | A1* | 3/2010 | Ehm | B08B 7/00 134/2 |
| 2012/0013976 | A1* | 1/2012 | Weber | B82Y 30/00 359/360 |
| 2012/0250144 | A1* | 10/2012 | Ehm | B82Y 10/00 359/360 |
| 2014/0193591 | A1* | 7/2014 | Kuznetzov | G02B 5/0891 427/527 |
| 2014/0199543 | A1* | 7/2014 | Ehm | G02B 1/105 428/336 |
| 2015/0092170 | A1* | 4/2015 | Ehrler | G03F 7/70166 355/55 |
| 2016/0202396 | A1* | 7/2016 | Goehnermeier | G02B 5/0816 359/359 |
| 2016/0304981 | A1* | 10/2016 | Song | C22C 38/40 |

FOREIGN PATENT DOCUMENTS

| | | | |
|---|---|---|---|
| DE | 10 2011 077983 A1 | 12/2012 | |
| DE | 10 2012 207125 A1 | 3/2013 | |
| DE | 102012207125 A1 * | 3/2013 | ........... G02B 5/0875 |
| DE | 102014209830 A1 * | 8/2014 | ........... G02B 5/0891 |
| JP | H10-125580 A | 5/1998 | |
| JP | 2003-178882 A | 6/2003 | |
| JP | 2010-500776 T | 10/2007 | |
| JP | 2011-204864 A | 10/2011 | |
| JP | 2013-225662 A | 10/2013 | |
| WO | 2005/091887 A2 | 10/2005 | |

OTHER PUBLICATIONS

Office Action, counterpart Korean Patent Application No. 10-2016-7024229, dated Apr. 27, 2021, 7 pages total (including English translation of 3 pages).

* cited by examiner

EUV OPTICAL ELEMENT HAVING BLISTER-RESISTANT MULTILAYER CAP

CROSS-REFERENCE TO RELATED APPLICATIONS

This application is a National Stage entry of International Application No. PCT/EP2015/051809, filed Jan. 29, 2015, which claims priority to European Patent Application No. 14154265.4, filed Feb. 7, 2014. The disclosures of the priority applications are incorporated in their entirety herein by reference.

FIELD

The present disclosure relates to optical elements designed to operate in environments in which they are subject to contamination and wear. An example of such an environment is the vacuum chamber of an apparatus for generating extreme ultraviolet ("EUV") radiation from a plasma created through discharge or laser ablation of a target material. In this application, the optical elements are used, for example, to collect and direct the radiation for utilization outside of the vacuum chamber, e.g., for semiconductor photolithography.

BACKGROUND

Extreme ultraviolet radiation, e.g., electromagnetic radiation having wavelengths of around 50 nm or less (also sometimes referred to as soft x-rays), and including radiation at a wavelength of about 13.5 nm, can be used in photolithography processes to produce extremely small features in substrates such as silicon wafers.

Methods for generating EUV radiation include converting a target material from a liquid state into a plasma state. The target material preferably includes at least one element, e.g., xenon, lithium or tin, with one or more emission lines in the EUV range. In one such method, often termed laser produced plasma ("LPP"), the required plasma can be produced by using a laser beam to irradiate a target material having the required line-emitting element.

One LPP technique involves generating a stream of target material droplets and irradiating at least some of the droplets with laser radiation pulses. In more theoretical terms, LPP sources generate EUV radiation by depositing laser energy into a target material having at least one EUV emitting element, such as xenon (Xe), tin (Sn), or lithium (Li), creating a highly ionized plasma with electron temperatures of several 10's of eV.

The energetic radiation generated during de-excitation and recombination of these ions is emitted from the plasma in all directions. In one common arrangement, a near-normal-incidence mirror (often termed a "collector mirror" or simply a "collector") is positioned to collect, direct, and, in some arrangements, focus the radiation to an intermediate location. The collected radiation may then be relayed from the intermediate location to a set of scanner optics and ultimately to a wafer.

In the EUV portion of the spectrum it is generally regarded as necessary to use reflective optics for the collector. At the wavelengths involved, the collector is advantageously implemented as a multi-layer mirror ("MLM"). As its name implies, this MLM is generally made up of alternating layers of material over a foundation or substrate.

The optical element must be placed within the vacuum chamber with the plasma to collect and redirect the EUV radiation. The environment within the chamber is inimical to the optical element and so limits its useful lifetime, for example, by degrading its reflectivity. An optical element within the environment may be exposed to high energy ions or particles of target material. The particles of target material can contaminate the optical element's exposed surface. Particles of target material can also cause physical damage and localized heating of the MLM surface. The target materials may be particularly reactive with a material making up at least one layer of the optical element surface, e.g., molybdenum and silicon. Temperature stability, ion-implantation, and diffusion problems may need to be addressed even with less reactive target materials, e.g., tin, indium, or xenon. Blistering of the MLM coating must also be avoided.

There are techniques which may be employed to increase optical element lifetime despite these harsh conditions. For example, a capping layer may be placed on the optical element to protect the surface of the optical element. To make the capping layer more reflective it may also have multiple layers spaced to increase reflectivity at the wavelength of the radiation to be reflected.

Such multilayer capping layers are, however, themselves prone to damage through mechanisms such as hydrogen diffusion and blistering. In some systems $H_2$ gas at pressures in the range of 0.5 to 3 mbar is used in the vacuum chamber for debris mitigation. In the absence of a gas, at vacuum pressure, it would be difficult if not impossible to protect the collector adequately from target material debris ejected from the plasma. Hydrogen is relatively transparent to EUV radiation having a wavelength of about 13.5 nm and so is preferred to other candidate gases such as He, Ar or other gases which exhibit a higher absorption at about 13.5 nm.

$H_2$ gas is introduced into the vacuum chamber to slow down the energetic debris (ions, atoms, and clusters) of target material created by the plasma. The debris is slowed down by collisions with the gas molecules. For this purpose a flow of $H_2$ gas is used which may also be counter to the debris trajectory. This serves to reduce the damage of deposition, implantation, and sputtering target material on the optical coating of the collector. Using this method it is believed possible to slow down energetic particles with energies of several keV to a few tens of eV by the many gas collisions at these pressures over the distance between the plasma site and the collector surface.

Another reason for introducing $H_2$ gas into the vacuum chamber is to facilitate cleaning of the collector surface. The EUV radiation generated by the plasma creates hydrogen radicals by dissociating the $H_2$ molecules. The hydrogen radicals in turn help to clean the collector surface from target material deposits on the collector surface. For example, in the case of tin as the target material, the hydrogen radicals participate in reactions on the collector surface that lead to the formation of volatile gaseous stannane ($SnH_4$) which can be pumped away. For this chemical path to be efficient it is preferred that there is a low H recombination rate (to form back $H_2$ molecules) on the collector surface so that the hydrogen radicals are available instead for attaching to the Sn to form $SnH_4$. Generally, a surface consisting of non-metallic compounds like nitrides, carbides, borides and oxides has a lower H recombination rate as compared to a surface consisting of pure metals.

The use of $H_2$ gas, however, can have a negative effect on a coating applied to the collector by both the light hydrogen atoms and molecules on the coating. It is believed that the hydrogen atoms are so small that they can easily diffuse several layers deep into a collector configured as a multilayer mirror. Hydrogen can be implanted if ion deceleration is insufficient and can also diffuse into the collector cap and layers of the multilayer mirror beneath the cap. These phenomena most severely affect outermost layers.

Once atomic hydrogen invades the body of the multilayer mirror it can bond to Si, get trapped at layer boundaries and interfaces, or both. The magnitude of these effects depends on the dose and concentration of hydrogen in these regions. If the hydrogen concentration is above a certain threshold it can form bubbles of gaseous hydrogen compounds, either recombining to $H_2$ molecules or perhaps also forming $SiH_4$. This happens most severely typically underneath the cap layer or in the outermost Si layer. When a gas bubble starts to form there is a high probability that it will grow in the presence of additional hydrogen. If such bubbles do form then their internal gas pressure will deform the layer above the bubble. The layer may then burst, thus releasing the gas, leading to the formation of blisters on the coating, typically with a size of a few tens of nm.

A blistered coating creates several problems. It has a higher surface area and is more prone to degradation by oxidation and other contaminants and by deposition of target material. Due to higher absorption this generally leads to a reduction of EUV reflectance. A blistered coating also scatters more light due to higher roughness and thus leads to significantly reduced EUV reflectance, even though the undamaged layers below still contribute to reflection of EUV light and even if the target material deposits are removed by cleaning.

In addition to these effects, hydrogen uptake and penetration can also lead to embrittlement of metal layers and thus cause layer degradation.

There thus is a need to exploit the advantages with respect to enhancing the EUV reflectance of using a multilayer capping layer while at the same time having a capping layer that is resistant to blistering.

SUMMARY

The following presents a simplified summary of one or more embodiments in order to provide a basic understanding of the embodiments. This summary is not an extensive overview of all contemplated embodiments, and is not intended to identify key or critical elements of all embodiments nor set limits on the scope of any or all embodiments. Its sole purpose is to present some concepts of one or more embodiments in a simplified form as a prelude to the more detailed description that is presented later.

According to one aspect, there is provided a multilayer mirror comprising a substrate, a multilayer coating on the substrate, and a capping layer on the multilayer coating, in which the capping layer includes an outermost layer comprising a material having a high resistance to target material deposition and a multilayer structure positioned between the outermost layer and the substrate, the multilayer structure comprising a plurality of bilayers, each of the bilayers comprising a spacer layer including a material resistant to hydrogen diffusion and blistering and an absorber layer including a material resistant to ion penetration.

The outermost layer may be a nitride or oxide with high resistance to target material deposition, good energy reduction for incident ions, and low secondary electron yield, such as ZrN, $Si_3N_4$, YN, $ZrO_2$, $Nb_2O_5$, and $TiO_2$. The spacer layers are preferably made from hydrogen-diffusion and blister-resistant materials such as nitrides, carbides, and borides. The absorber layers are preferably made from suitable oxide, nitride or metal layers which can reduce the penetration of incident ions. Suitable materials for the nitride layers include $Si_3N_4$ and YN. Suitable materials for the carbide and boride layers include $B_4C$, C, ZrC, and $YB_6$. Suitable materials for the oxide layers include $ZrO_2$, $TiO_2$, $Ta_2O_5$, and $Nb_2O_5$. Suitable materials for the metal layers include $Mo_2C$, Mo and W.

DETAILED DESCRIPTION

Figure 1:
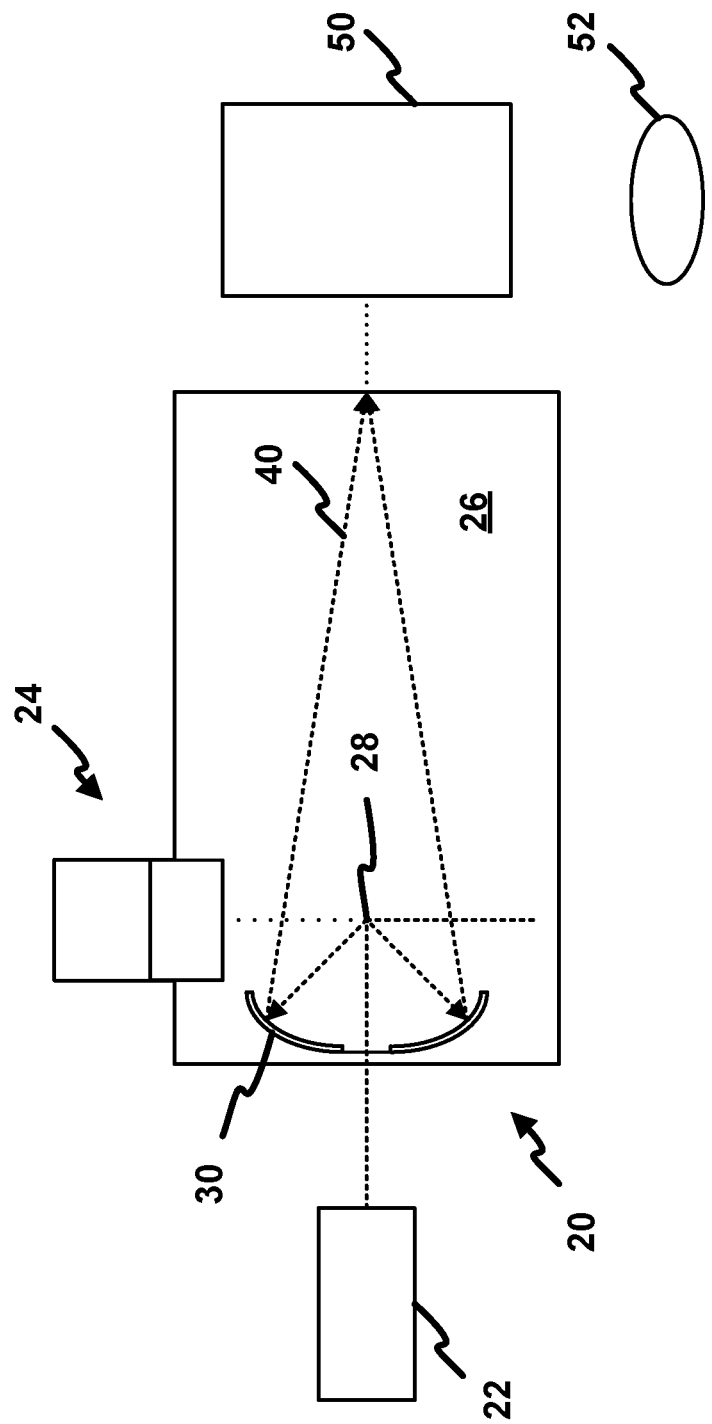
FIG. 1 shows a schematic, not-to-scale, view of an overall broad conception for a laser-produced plasma EUV radiation source system according to an aspect of the present invention.

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments.

With initial reference to FIG. 1 there is shown a schematic view of an exemplary EUV radiation source, e.g., a laser produced plasma EUV radiation source 20 according to one aspect of an embodiment of the present invention. As shown, the EUV radiation source 20 may include a pulsed or continuous laser source 22, which may for example be a pulsed gas discharge $CO_2$ laser source producing radiation at 10.6 μm. The pulsed gas discharge $CO_2$ laser source may have DC or RF excitation operating at high power and high pulse repetition rate.

The EUV radiation source 20 also includes a target delivery system 24 for delivering target material in the form of liquid droplets or a continuous liquid stream. The target material may be made up of tin or a tin compound, although other materials could be used. The target material delivery system 24 introduces the target material into the interior of a chamber 26 to an irradiation region 28 where the target material may be irradiated to produce plasma. In some cases, an electrical charge is placed on the target material to permit the target material to be steered toward or away from the irradiation region 28. It should be noted that as used herein an irradiation region is a region where target material irradiation may occur, and is an irradiation region even at times when no irradiation is actually occurring.

Continuing with FIG. 1, the radiation source 20 may also include one or more optical elements. In the following discussion, a collector 30 is used as an example of such an optical element, but the discussion applies to other optical elements as well. The collector 30 may be a normal incidence reflector, for example, implemented as an MLM, that is, a silicon carbide (SiC) substrate coated with a molybdenum/silicon (Mo/Si) multilayer with additional thin barrier layers, for example $B_4C$, ZrC, $Si_3N_4$ or C, deposited at each interface to effectively block thermally-induced interlayer diffusion. Other substrate materials, such as aluminum (Al) or silicon (Si), can also be used. The collector 30 may be in the form of a prolate ellipsoid, with an aperture to allow the laser radiation to pass through and reach the irradiation region 28. The collector 30 may be, e.g., in the shape of a ellipsoid that has a first focus at the irradiation region 28 and a second focus at a so-called intermediate point 40 (also called the intermediate focus 40) where the EUV radiation may be output from the EUV radiation source 20 and input to, e.g., an integrated circuit lithography tool 50 which uses the radiation, for example, to process a silicon wafer workpiece 52 in a known manner. The silicon wafer workpiece 52 is then additionally processed in a known manner to obtain an integrated circuit device.

As described above, one of the technical challenges in the design of an optical element such as the collector 30 is extending its lifetime. One way to extend the lifetime of the collector 30 involves protecting it from damage by using an outermost cap layer. The cap layer system is itself advantageously a multilayer system composed of several alternating spacer and absorber layers to provide enhanced EUV reflectance of the collector mirror coating (for example at 13.5 nm wavelength). Just as with the multilayer of the main (Mo/Si) coating of the collector 30, the multilayered cap layer system also has to have a graded design with the bilayer spacing matched to the incidence angle as a function of the radius of the collector 30.

Figure 2:
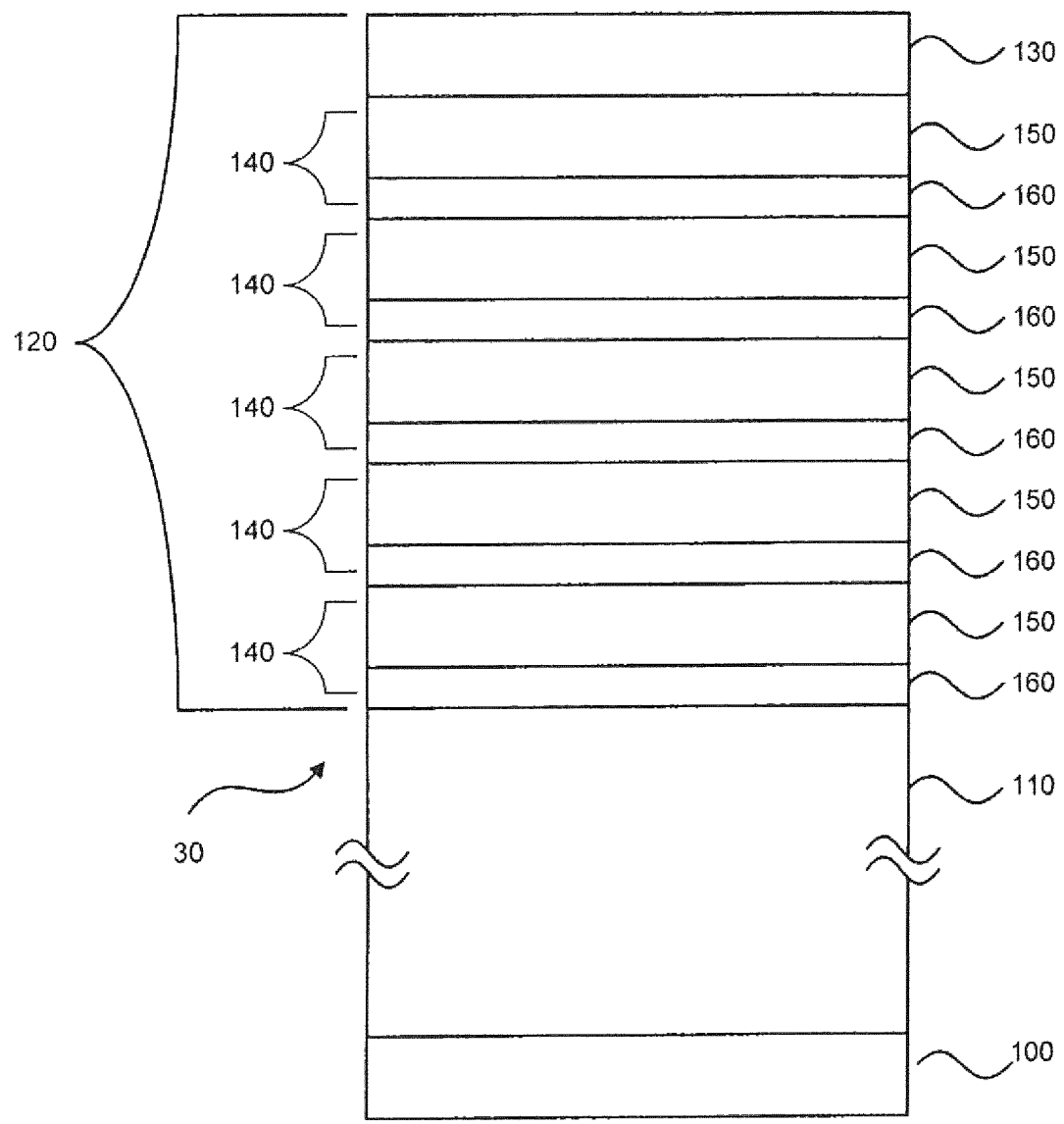
FIG. 2 is a schematic, not-to-scale diagram of a cross section of an EUV optical element with a multilayer capping layer.

An example of an MLM collector 30 with a multilayer cap is shown in FIG. 2 which is a cross section though a portion of such a collector. As can be seen there, the collector 30 includes a substrate 100. A multilayer coating 110 is located on the substrate 30. The multilayer coating 110 is made up of alternating layers of material, for example, molybdenum and silicon, in a known fashion. Located on the multilayer coating 110 is a capping layer 120 which is made up of an outermost layer 130 and a series of repeating bilayers 140. Each of the bilayers 140 preferably includes a spacer layer 150 and an absorber layer 160. FIG. 2 shows an arrangement with five bilayers but one of ordinary skill in the art will readily appreciate that other numbers of bilayers may be used.

The purpose of the multilayer cap is to protect the collector 30 without excessively decreasing the overall reflectivity of the collector 30 at the wavelengths of interest, e.g., 13.5 nm. It is, however, preferable to select materials for the layers within the multilayer cap that will resist blistering and hydrogen diffusion. For example, multilayered cap bilayers that include silicon such as a zirconium nitride/silicon (ZrN/Si) bilayer or a tungsten/silicon (W/Si) bilayer may be prone to blistering. This is due to a hydrogen reaction within the Si layers where dangling bonds at the layer boundary react with hydrogen and in the bulk of the layer. The reaction can form $SiH_4$ (silane) and hydrogen blisters inside of the silicon layers. Other bilayer combinations such as molybdenum/yttrium (Mo/Y) may not provide an effective bather to hydrogen diffusion.

It is thus advantageous to provide for a cap layer system that protects the collector 30 coating against target material (e.g., tin) deposition, hydrogen ion penetration, hydrogen diffusion, and hydrogen or oxygen induced blistering.

By choosing materials for the spacer layers of the cap multilayer system in the form of suitable nitrides, carbides, and borides (such as trisilicon tetranitride ($Si_3N_4$), zirconium nitride (ZrN), silicon carbide (SiC), carbon (C), yttrium nitride (YN), yttrium hexaboride ($YB_6$), zirconium carbide (ZrC), silicon hexaboride ($SiB_6$), and boron carbide ($B_4C$)) hydrogen diffusion into the multilayer coating is reduced and reaction with hydrogen in the spacer layers is reduced, leading to a resistance against the formation of hydrogen-induced blisters. By choosing materials as absorber layers in the form of suitable oxide, nitride, or metal layers (such as tantalum pentoxide ($Ta_2O_5$), titanium dioxide ($TiO_2$), zirconium dioxide ($ZrO_2$), niobium pentoxide ($Nb_2O_5$), yttrium oxide ($Y_2O_3$), aluminum oxide ($Al_2O_3$), titanium-aluminum-oxynitride (TiAlON), ZrN, silicon nitride (SiN), titanium nitride (TiN), Mo, W, and Zr) the protection of the topmost layer against tin deposition is increased and the protection against hydrogen penetration and target material penetration and, in part, against hydrogen diffusion is increased.

Referring again to FIG. 2, the topmost layer 130 of the cap 120 is preferably a nitride or oxide with high resistance to target material deposition. In effect, these are preferably materials having a low recombination rate for atomic hydrogen to enable a high formation rate of stannane. These would typically be materials having a hydrogen recombination coefficient in a range of about $10^{-4}$ to about $10^{-3}$. Effectively this means the preferred material exhibits a good tin cleaning rate since the H can react with Sn before it recombines to $H_2$. As an example, the metal stainless steel has a recombination coefficient of $2.2 \times 10^{-3}$. A preferred material for the topmost layer 130 of the cap 120 also preferably exhibits good energy reduction for incident ions and low secondary electron yield. Examples of materials having low recombination coefficients, good energy reduction for incident ions, and low secondary electron yield include ZrN, $TiO_2$, $Ta_2O_5$, and $ZrO_2$.

The spacer layers are preferably made from hydrogen-diffusion and blister-resistant materials such as nitrides and carbides. The spacer layers are preferably grown amorphously to act as efficient barriers for hydrogen diffusion. Some materials exhibit microcrystalline growth in thin layers. For such materials, hydrogen can diffuse more easily along grain boundaries in crystalline layers; therefore, amorphously grown layers and layers with low defect densities are preferred as hydrogen barriers. Carbides, borides and nitrides are perceived as good hydrogen diffusion barrier layers. In general, ceramics are considered good barriers for H diffusion. Also, the spacer layers are preferably made of a material that is relatively inert with respect to reactions with hydrogen. For example, SiC (silicon carbide) has all bonds between Si and C saturated and is thus less prone to blistering. Yttrium nitride (YN) is a better barrier layer with respect to hydrogen diffusion compared to pure yttrium which shows micro-crystalline growth.

The absorber layers are preferably made from suitable oxide or metal layers which can reduce the penetration of incident ions. In other words, the material for the absorber layer preferably has relatively high stopping power for impacting hydrogen ions. This implies a relatively large preferred stopping cross section. It is preferred hydrogen ions having energy in the about 100 eV energy should not be able to penetrate the material more than a few nanometers. $ZrO_2$ is an example of such a material. As for metals, molybdenum is a preferred material, and for some applications molybdenum carbide ($Mo_2C$) is preferred as the "metal" material because it has almost the same EUV reflectance as Mo but better growth properties and better properties with respect to H diffusion.

Besides these properties, the layer materials in the cap layer also have to have good transparency to EUV radiation at 13.5 nm wavelength.

Suitable materials for nitride layers include $Si_3N_4$, ZrN, YN, SiN, NbN, TiN, and BN.

Suitable materials for carbide layers include SiC, $B_4C$, C, and ZrC.

Suitable materials for boride layers include $ZrB_2$, $NbB_2$, $YB_6$, and $SiB_6$.

Suitable materials for the oxide layers include $ZrO_2$, $TiO_2$, $Ta_2O_5$, $Nb_2O_5$, $Y_2O_3$, $Al_2O_3$, and titanium-aluminum-oxynitride (TiAlON).

Suitable materials for the metal layers include Mo, W, and $Mo_2C$.

The presently preferred combinations of materials for the absorber/spacer bilayer include: Mo as the material for the absorber and $Si_3N_4$, YN, $B_4C$, ZrC, C, or $YB_6$ as the material for the spacer; W as the material for the absorber and $Si_3N_4$, YN, $B_4C$, ZrC, C, or $YB_6$ as the material for the spacer; $ZrO_2$ as the material for the absorber and $Si_3N_4$, YN, $B_4C$, ZrC, C, or $YB_6$ as the material for the spacer; $Nb_2O_5$ as the material for the absorber and $Si_3N_4$, YN, $B_4C$, ZrC, C, or $YB_6$ as the material for the spacer; $TiO_2$ as the material for the absorber and $Si_3N_4$, YN, $B_4C$, ZrC, C, or $YB_6$ as the material for the spacer; and $Mo_2C$ as the material for the absorber and $Si_3N_4$, YN, $B_4C$, ZrC, C, or $YB_6$ as the material for the spacer.

The above description includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A multilayer mirror comprising:
    a substrate;
    a multilayer coating on the substrate; and
    a capping layer on the multilayer coating, the capping layer comprising
        an outermost layer comprising Nb2O5 or TiO2, and
        a multilayer structure positioned between the outermost layer and the multilayer coating, the multilayer structure comprising a plurality of bilayers, each of the bilayers comprising a spacer layer comprising a first material and an absorber layer comprising a second material different from the first material, one of the first material and the second material comprising ZrN.

2. The multilayer mirror as claimed in claim 1 wherein the other of the first material and the second material comprises B4C.

3. A multilayer mirror comprising:
    a substrate;
    a multilayer coating on the substrate; and
    a capping layer on the multilayer coating, the capping layer comprising:
        an outermost layer comprising Ta2O5 and
        a multilayer structure positioned between the outermost layer and the multilayer coating, the multilayer structure comprising a plurality of bilayers, each of said bilayers comprising a spacer layer comprising a spacer layer nitride material resistant to hydrogen diffusion and blistering and an absorber layer comprising an oxide material resistant to ion penetration.

4. A multilayer mirror comprising:
    a substrate;
    a multilayer coating on the substrate; and
    a capping layer on the multilayer coating, the capping layer comprising
        an outermost layer comprising ZrN, and
        a multilayer structure positioned between the outermost layer and the multilayer coating, the multilayer structure comprising a plurality of bilayers, each of the bilayers comprising a spacer layer comprising a first material and an absorber layer comprising a second material different from the first material, at least one of the bilayers comprising ZrN.

5. A multilayer mirror comprising:
    a substrate;
    a multilayer coating on the substrate; and
    a capping layer on the multilayer coating, the capping layer comprising
        an outermost layer comprising Nb2O5 or TiO2, and
        a multilayer structure positioned between the outermost layer and the multilayer coating, the multilayer structure comprising a plurality of bilayers, each of the bilayers comprising a spacer layer comprising a first material and an absorber layer comprising a second material different from the first material, one of the first material and the second material comprising ZrO2 and the other of the first material and the second material comprising ZrN.

* * * * *